Patented July 15, 1952

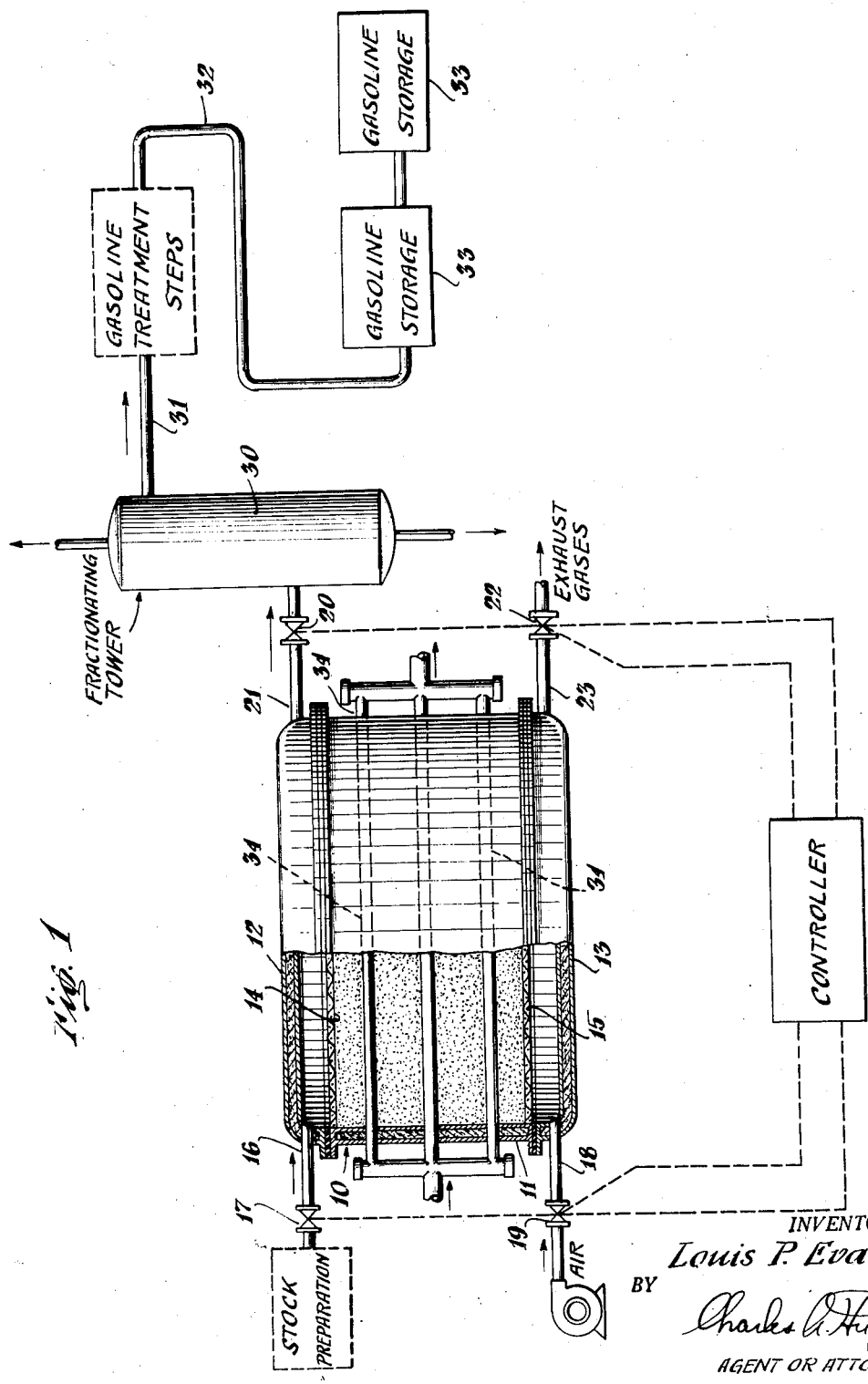

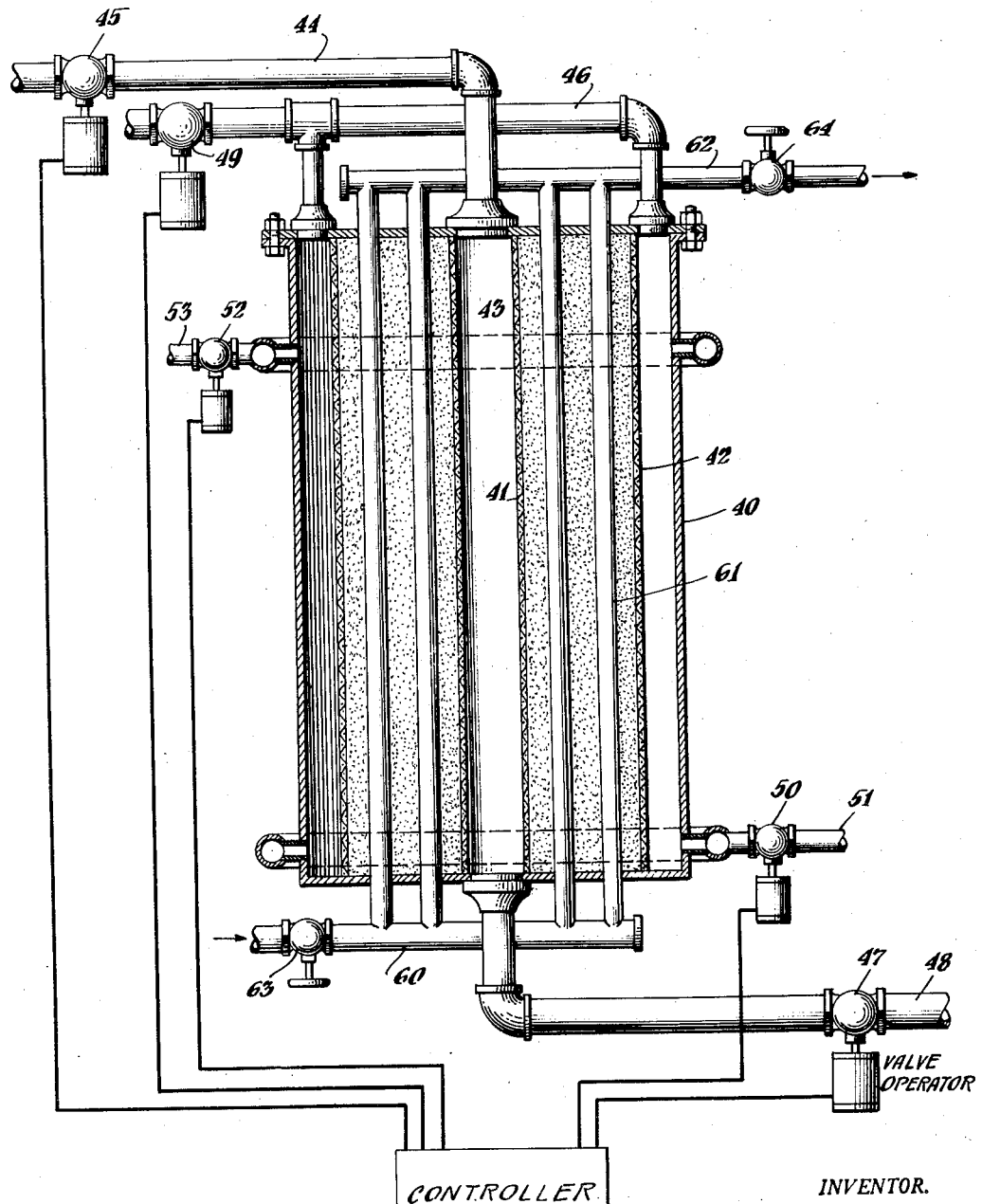

2,603,591

UNITED STATES PATENT OFFICE 2,603,591

PULSATING HYDROCARBON CONVERSION

Louis P. Evans, Woodbury, N. J., assignor to Socony-Vacuum Oil Company, Incorporated, a corporation of New York Application February 11, 1950, Serial No. 143,664

3 Claims. (Cl. 196—50)

The invention is directed to a novel method and apparatus for the conversion of fluid reactants in the presence of subdivided solid catalyst or particle-form material. It is particularly directed to the catalytic conversion of hydrocarbons in the presence of subdivided solid catalyst to form more desirable hydrocarbons.

It is well known that hydrocarbons may be converted, for various purposes, in the presence of particle-form solid contact mass materials. The purpose of the conversion may be cracking of a gas oil to gasoline, reforming, dehydrogenation, dehydrocyclization, destructive hydrogenation, alkylation, isomerization, polymerization, or other processes. The contact mass material is usually an adsorptive material of the general nature of clay, such as fuller's earth, filter clays, refined and natural clays, acid treated clays, various synthetic associations of alumina and silica, such as coprecipitated gels, gels of alumina and/or silica, and similar materials, any of which may have added materials, such as various metallic oxides, for various catalytic purposes connected with the conversion contemplated. For example, in reforming hydrocarbons, aromatizing or dehydrogenating catalyst such as tin, chromium or aluminum gels are used, or alumina with molybdenum oxide deposited thereon. In some instances, such as, for example, the conversion of gas oil to ethylene, inert, particle-form solids are used, such as refractory materials mullite, Corhart, or even iron balls.

Several systems of conversion of hydrocarbons are known and practiced in the petroleum art which use particle-form contact masses. The most common systems are popularly known as the "fixed bed system," the "fluid system" and the "moving bed system." Each of these methods of hydrocarbon conversion has inherent advantages over the other systems and also inherent disadvantages. For example, in the fixed bed system the hydrocarbons at conversion conditions are passed through a bed of contact material wherein they are converted to more desirable hydrocarbons. During the conversion, the activity of the catalyst varies as coke, formed during the cracking operation, adheres to the surface of the contact material. As the activity of the contact material varies during the conversion, the amount of the products varies in accordance therewith. The products removed from the reactor are charged to a fractionating tower where the products are separated and the separated products are then charged to other refinery apparatus for further treatment. The proper operation of the fractionator and related refinery equipment requires that the feed to the fractionator be of fairly uniform composition. Therefore, in order to maintain a fairly uniform feed to the fractionator, the prior art shows the use of several fixed bed convertors operating in a sequence of steps, for example, reaction, purge, regeneration, and purge steps with at least one reactor on stream at all times, and preferably several reactors on stream at the same time in overlapping sequence. Although a fairly uniform feed is supplied to the fractionating equipment by this procedure, a great amount of costly equipment is required, making this system unattractive, particularly to the smaller refiner.

In the fluid system of conversion, contact material in powdered form is maintained in ebullient motion in reaction and regeneration vessels by passing gases upwardly through the mass of powder at sufficient velocity. A stream of the powder is continuously transported from the reactor to the regenerator and a second stream of powder is transported from the regenerator to the reactor, thereby permitting the maintenance of a mass of particles in the reactor of which the average is partially covered with carbonaceous deposits. An obvious disadvantage of this system is the fact that the reactor will contain particles of all degrees of coverage of the particles by carbonaceous deposits from fully covered to completely free of deposits. Contact material in this condition converts a smaller percentage of the feed stock to hydrocarbons in the gasoline boiling range than particles completely free of carbonaceous deposits.

In the moving bed system the contact material is passed downwardly as substantially compact columns through the reaction and regeneration vessels. Elevators or fluid lifts are used to raise the contact material from the bottom of one column to the top of the other column. This system provides a uniform bed of deposit-free contact material at the top of the reactor and a uniform build up of the deposits on the contact material as it passes downwardly through the vessel. Both the fluid and moving bed systems provide a continuous conversion to a substantially uniformly composed product permitting the fractionating equipment to operate at maximum efficiency, but the moving bed system has the advantage of greater conversion to gasoline boiling products. Because of the continuous movement, however, of many tons of particle-form solid material, the particles spall and fracture, causing the formation of undesirable fines. These fines cause various troubles in the system when they concentrate in certain regions. For example, they may cause an interruption of flow in the contact material feed leg to the reactor or cause zones of unequal pressure in the reaction vessel which causes the reactants to pass through one section of the moving bed in greater quantity than in the remaining sections, which in turn causes portions of the contact material bed to be covered with deposits at a faster rate than the remaining portions.

The object of the present invention is to provide apparatus and a hydrocarbon conversion system which will possess the inherent advantages of the previous systems without possessing their disadvantages. A further object of this invention is to provide a suitable conversion system which is not as expensive as previous systems. A further object of this invention is to provide apparatus and a system which will provide continuously a product of converted hydrocarbons sufficiently uniform in composition to maintain fractionating equipment under operation at maximum efficiency. These and other objects of this invention will be made apparent by reference to the attached drawing and following description of the invention; in which, Figure 1 is a diagrammatic view of a hydrocarbon converter, partially in section, with related refinery equipment; and in which, Figure 2 is a diagrammatic view of a hydrocarbon reformer, partially in section, and related conduit connections.

Referring to the Figure 1, a fixed-bed conversion chamber 10 is shown, partially in section. The chamber comprises a central section 11, a top section 12 and a bottom section 13. The contact material, in particle form, is retained in the central section 11 by screens or previous partitions 14, 15. The top and bottom sections 12, 13 are shaped to form suitable fluid introduction and removal manifolds.

In the operation of the system, the hydrocarbon charging stock, properly prepared for conversion, is introduced into the upper manifold through the conduit 16. The flow of reactants may be controlled by the valve 17 in the conduit 16. The hydrocarbons pass downwardly through the bed in contact with the comminuted particle-form adsorbent catalyst and are converted thereby to conversion products. Just prior to the time when the hydrocarbon vapors would emerge from the bed of catalyst into the lower manifold region, air is introduced into the lower manifold through the conduit 18. The air flow may be controlled by the valve 19. The valve 17 is closed and the valve 20 in the exit conduit 21 from the upper manifold is opened. The air pressure builds up in the lower manifold and air enters the bed of catalyst in an upward direction forcing the reactant products upward and out of the chamber 10 through the exit conduit 21. Just prior to the time when the air would emerge from the top of the bed of contact material, the valve 17 is opened admitting reactant fluids to the upper manifold, and the valve 20 is closed. The valve 22 in the exit conduit 23 from the lower manifold is opened and the valve 19 in the air inlet conduit 18 is closed. Thus the reactant fluids force the exhaust gases, formed during the regeneration phase of the process, out the exit conduit 23.

It is seen that by proper manipulation of the valves the reactant vapors and air may be made to pulse through the bed during exceedingly short cycles. By this procedure the bed is maintained at a fairly uniform degree of activity or exposure and substantially completely activated condition at all times. The products delivered to the fractionating equipment remain of substantially uniform composition and flow at a continuous intermittent rate.

There is only slight mixing at the interface between the pulsing reactant vapors and combustion air, the two fluids being maintained substantially separated by a thin layer of pulsating stagnant gas.

The products removed from the chamber 10 through the conduit 21 may be introduced directly into a fractionating column 30. Non-condensible gases are removed from the top of the column and heavy ends are removed from the bottom. The gasoline fractions are removed from an intermediate point through the conduit 31 to other refinery apparatus for further treatment to produce improved gasoline. The prepared product is then customarily sent to storage such as through the conduit 32 to the storage tanks 33.

Many contacting reactions are endothermic requiring the addition of heat to maintain the reaction. The catalytic conversion of hydrocarbons is typical of this type. Variation in the temperature of the bed during cracking causes a shift in the distribution of the products, which has been shown to be undesirable. The combustion of coke on the catalyst formed during the conversion of the hydrocarbons is an exothermic reaction. Therefore, in the pulsating system of catalytic conversion, the heat supplied to the catalyst during the regeneration phase is withdrawn by the reactants during the reaction phase. In many instances there is a substantial balance between the heat released during regeneration and that absorbed during reaction, whereby a substantially uniform and constant temperature is maintained in the reaction chamber 10. In some instances, however, an excess of heat will be generated during the regeneration phase over that required during the reaction phase. Heat exchanger tubes 34 are provided through the bed of contact material through which a suitable cooling fluid, such as liquid sodium nitrate, for example, may be passed to extract the excess heat generated, or in certain circumstances, a heating fluid may be passed to provide heat to the bed.

As indicated, the valves 17, 19, 20 and 22 are, suitably, automatically operated and controlled by a central controller, adapted to appropriately time the sequence of steps. For example, in the catalytic conversion of hydrocarbons to compounds boiling in the gasoline range, a complete cycle of operation is effected approximately every 30 seconds. The pressure in the vessel may be at substantially atmospheric pressure or may be under a pressure of about 5–15 p. s. i. g. Other pressures may be used for other types of conversion. For example, in reforming in the presence of hydrogen, which may be added with the charge, pressure in the neighborhood of 200–300 p. s. i. g. may be utilized. The temperature of the bed during normal operation will be in the neighborhood of 800–1100° F., although much higher temperatures may be used in special instances.

Referring now to Figure 2, apparatus is shown which can be used in a reforming process to upgrade gasoline stocks to improve octane and other properties of the hydrocarbons. The outer vessel 40 is a vertically mounted vessel of circular cross-section. Within the vessel 40 are mounted two screens or pervious partitions 41, 42, substantially vertically mounted. The annulus between the screens 41, 42 is filled with a particle-form catalyst or contact material, suitable for effecting reforming of the hydrocarbons in the presence of hydrogen gas. A mixture of hydrocarbons and hydrogen properly prepared for conversion, in the ratio of about ½–10 mols of hydrogen gas to 1 mol of hydrocarbon charge is introduced into the central region 43 through the conduit 44. The flow of gases is controlled by the automatic valve 45. The vapors permeate through the bed of contact material, which may be a particle-form alumina with molybdenum oxide deposited thereon. Just prior to emergence of the vapors through the outer screen 42 hydrogen is introduced through the conduit 46 into the region between the outer screen and the wall of the vessel 40, and the valve 45 is automatically closed. The valve 47 is automatically opened to allow the reformed hydrocarbons to exit through the conduit 48, the flow of hydrogen in the conduit 46 being controlled by the automatically operated valve 49. The hydrogen enters the catalyst bed, pushing the reformed hydrocarbons out of the bed. The carbonaceous deposits, formed on the catalyst during the reforming, are largely removed in the presence of the hydrogen, and converted to usable hydrocarbon vapors.

When the hydrocarbons have been cleared from the central region, the valve 49 is closed, preventing the further introduction of hydrogen, and the valve 50 in the conduit 51 is automatically opened to permit the exit of excess hydrogen or hydrogen and steam. The complete cycle is repeated every 30 seconds approximately, requiring about 15 seconds for reaction and 15 seconds for hydrogen purge. By using hydrogen to purge the products from the bed and reform part of the carbonaceous deposits, the onstream time may be increased several hundred times, without requiring regeneration of the catalyst in the presence of a combustion supporting gas.

After the deposits on the catalyst have reached a predetermined amount, the hydrogen feed valve 49 may be kept closed and the valve 52 opened in place of the valve 49 to feed oxygen-containing gas through the conduit 53 to the ring manifold 54 and into the annulus between the screen 42 and the wall of the vessel 40 to burn off the carbonaceous deposits from the contact material. This can be done cyclically without interrupting cyclic operation, or may be done continuously for the period of time required to remove the deposits from the contact material. In the former case the flue gases are exhausted through the conduit 51 to a zone not shown, and in the latter case the flue gases are exhausted through the conduit 48 to a zone not shown. Steam may be introduced with the air or combustion supporting gas through the conduit 53 to aid in the removal of carbonaceous material from the surface of the contact material.

The reforming may suitably be performed in the vessel 40 at a temperature of about 800–1100° F. at a pressure of about 30–500 p. s. i. g. and a ratio of about ½–10 mol of hydrogen to 1 mol of hydrocarbon charge. The charge may be a suitably selected naphtha which will provide a reasonable balance between the endothermic reactions of dehydrogenation and dehydrocyclization and exothermic reactions of destructive hydrogenation and other hydrogenation reactions. Slight inequality in the heat balance can be compensated for by flowing a suitable cooling or heating fluid through the conduit 60, tubes 61, and conduit 62 of the heat exchanger buried in the bed of contact material. The flow of cooling through the heat exchanger is controlled by the valves 63, 64.

Because of the rapidity with which the phases of the cycle change, it is essential that the opening and closing of the valves be properly timed and their operation be automatic. These valves are connected to a central controller adapted to open and close the various valves at the desired time and in the desired sequence.

In another method of operating the pulsating reactor, shown on Figure 1, hydrocarbon vapors, suitably prepared for conversion are continuously admitted to the reactor 10 through the conduit 16, the valve 17 being kept open or removed from the line. Simultaneously, combustion supporting gas, at substantially the same pressure, is supplied to the opposite side of the reactor 10 through the conduit 18, the valve 19 being kept open or removed. When valve 20 in the exit conduit 21 is open the valve 22 in the exit conduit 23 is closed. As a result, the pressure of the combustion supporting gas in the lower manifold rises slightly above the pressure of the hydrocarbon vapors in the upper manifold, causing the combustion supporting gas to penetrate and move upwardly through the bed. Just prior to the emergence of the combustion supporting gas in the region of the upper manifold, the position of the valves 20, 22 is reversed. The reversal of the valves 20, 22 causes the pressures in the manifolds to reverse, and the hydrocarbon vapors enter the bed, forcing the combustion gases out the exit conduit 23. By continuous reversals of the valves 20, 22 in the exit conduits, the pulsating system of hydrocarbon conversion is performed in the reactor 10. It is possible to control the frequency of the pulses by controlling the pressure of the fluids admitted to the reactor and also by controlling the design of the conduit paths. It is desirable that the frequency of the pulses be maintained high in order that substantially uniform product distribution be maintained and in order that the activity of the catalyst be maintained substantially constant. Cycles of about one every 30 seconds are preferred, although the cycles may range from about one every 3 seconds to about one every 300 seconds.

Another embodiment of this invention comprises admitting hydrocarbon vapors, properly prepared for conversion to one side of the bed and combustion supporting gas to the other side. Discharge lines are attached to each side of the bed of contact material adapted to feed reactant vapors to the fractionating equipment and combustion gases to the exhaust system. In this embodiment, the control is maintained by intermittently opening and closing a valve in one of the conduits, thereby causing the fluids to cyclically pulse through the bed of contact material. For example, hydrocarbon vapors are supplied at one side of the bed, under constant pressure, and withdrawn as reactant vapor, on the same side of the bed, to fractionating equipment. Air is supplied to the opposite side of the bed at a somewhat higher pressure than the pressure of the hydrocarbon vapors. This causes the air to penetrate the bed forcing the reactant vapors through the vapor outlet to the fractionator. A valve in the air inlet conduit is closed automatically causing the pressure of the air on the air-inlet side of the bed to fall rapidly below the pressure of the hydrocarbon vapors, causing a reversal of the flow of fluids through the bed. It is seen that the apparatus may be made to follow a pulsating process by controlling a valve in any of the inlet or outlet hydrocarbon or combustion supporting fluid conduits. Automatic operating devices may be adjusted to provide the control of the pressures on each side of the bed to effect the desired pulsating hydrocarbon conversion.

It is important to note in this invention that purging of the catalyst or contact material between reaction and regeneration is eliminated. It has long been recognized that by using short cycles of reaction and regeneration it might be possible to convert in the presence of the catalyst when it is maintained at its highest activity. Consequently, the steps of reaction, purge, regeneration, purge have each been shortened in an effort to achieve this effect. But, experimentation proved that the duration of the purge steps could not be successfully reduced below a certain minimum, dependent upon size of contact bed, catalyst density, and certain other factors.

Attempts to reduce the purge period below the critical minimum time produced several undesirable effects which defeated the purpose of the reduction. For example, the purging of the vapors subsequent to reaction was incomplete and the remaining unremoved hydrocarbons were burned during regeneration, producing increased deposits on the contact material. Similarly, incomplete purging of the regeneration gases left combustion supporting gases in the vessel during conversion, and hence, a portion of the charge was oxidized by these gases producing additional carbonaceous deposits on the contact material. The extra carbon deposited on the contact material made it necessary to lengthen the percentage of the cycle used for regeneration, thereby decreasing the reaction period and hence, decreasing the yield of products produced by the apparatus. In addition to the loss of product entailed, the required longer regeneration period upset the heat balance by producing materially more heat during regeneration than could be successfully utilized during reaction. Attempts to correct this trouble by reducing the temperature of the feed charged to the reactor were unsuccessful. It was found that the cool charge tended to condense initially on the contact material, which resulted in an increased lay down of carbonaceous deposits on the contact material.

By this invention these difficulties are obviated. The layer of stagnant gas, if maintained in the bed, adequately separates the reaction and regeneration gases. In effect, the reaction gases purge the regeneration gases and vice versa, all the steps being effected concomitantly, permitting the use of very short, pulsating cycles.

Although the invention has been described with particular reference to catalytic conversion and reforming, it is not meant to be restricted to the use of catalytic material. And although particular shapes of reaction vessels have been described this, also, is not meant to be limiting.

What is claimed is:

1. The method of converting hydrocarbons in the presence of a fixed bed of comminuted solid contact material comprising: introducing reactant hydrocarbons into one side of a bed of contact material, at a pressure which is high enough to force the hydrocarbons to penetrate the bed, stopping the flow of reactant hydrocarbons to the bed prior to the emergence of reactants from the other side of the bed and starting the flow of combustion supporting gas into said other side of the bed, at a pressure which is high enough to force the combustion supporting gas to penetrate the bed and drive the reactants back out of the bed, withdrawing the conversion products driven from the bed to a collection zone, stopping the flow of combustion supporting gas just prior to the emergence of said gas from the first side of the bed and starting the flow of reactants into said first side of the bed, at a pressure which is high enough to force the reactants to penetrate the bed and drive the combustion gas back out of the bed, withdrawing the combustion gas driven from the bed to a receiving zone and maintaining the pulsation of gases in the bed sufficiently short to provide a substantially continuous flow of reactants to said collection zone of substantially uniform composition.

2. The method of converting hydrocarbons in the presence of a fixed bed of comminuted solid contact material comprising: introducing reactant hydrocarbons into one side of a bed of contact material, at a pressure which is high enough to force the hydrocarbons to penetrate the bed, stopping the flow of reactants to the bed prior to the emergence of reactants from the other side of the bed and starting the flow of combustion supporting gas into said other side of the bed, at a pressure which is high enough to force the combustion supporting gas to penetrate the bed and drive the reaction products back out of the bed, withdrawing the reaction products driven from the bed to a collection zone, stopping the flow of combustion supporting gas just prior to the emergence of said gas from the first side of the bed and starting the flow of reactants into said first side of the bed, at a pressure which is high enough to force the reactants to penetrate the bed and drive the combustion gas back out of the bed, withdrawing the combustion gas driven from the bed to a receiving zone and maintaining the pulsations of gases in the bed between about one every 3 seconds to about one every 300 seconds whereby reaction products of substantially uniform composition are supplied to the collection zone.

3. The method of converting hydrocarbons in the presence of a fixed bed of granular catalyst comprising: introducing reactant hydrocarbons into one side of a bed of contact material, at a pressure which is high enough to force the hydrocarbons to penetrate the bed, stopping the flow of reactants to the bed prior to the emergence of reactants from the other side of the bed and starting the flow of combustion supporting gas into said other side of the bed, at a pressure which is high enough to force the combustion supporting gas to penetrate the bed and drive the reaction products back out of the bed, withdrawing the reaction products driven from the bed to a collection zone, stopping the flow of combustion supporting gas just prior to the emergence of said gas from the first side of the bed and starting the flow of reactants into said first side of the bed, at a pressure which is high enough to force the reactants to penetrate the bed and drive the combustion gas back out of the bed, withdrawing the combustion gas driven from the bed to a receiving zone and maintaining the pulsations of gases in the bed at about one every 30 seconds whereby reaction products of substantially uniform composition are supplied to the collection zone.

LOUIS P. EVANS.

REFERENCES CITED

The following references are of record in the file of this patent:

UNITED STATES PATENTS

| Number | Name | Date |
|---|---|---|
| 2,363,738 | Mathers et al. | Nov. 28, 1944 |
| 2,472,844 | Munday et al. | June 14, 1949 |
| 2,491,303 | Eastman | Dec. 13, 1949 |